(12) United States Patent
Ehrenberg (10) Patent No.: US 11,081,280 B2
(45) Date of Patent: Aug. 3, 2021

(54) IONOMERIC POLYMER AND MULTILAYER CAPACITOR AND ADDITIVES

(71) Applicant: Ehrenberg Industries Corporation, Trinity, FL (US)

(72) Inventor: Scott Ehrenberg, Trinity, FL (US)

(73) Assignee: Ehrenberg Industries Corporation, Trinity, FL (US)

( * ) Notice: Subject to any disclaimer, the term of this patent is extended or adjusted under 35 U.S.C. 154(b) by 0 days.

(21) Appl. No.: 16/967,764

(22) PCT Filed: Feb. 6, 2019

(86) PCT No.: PCT/US2019/016934
§ 371 (c)(1),
(2) Date: Aug. 6, 2020

(87) PCT Pub. No.: WO2019/157112
PCT Pub. Date: Aug. 15, 2019

(65) Prior Publication Data
US 2021/0012962 A1 Jan. 14, 2021

Related U.S. Application Data (60) Provisional application No. 62/627,187, filed on Feb. 6, 2018.

(51) Int. Cl.
*H01G 4/18* (2006.01)
*C08L 53/02* (2006.01)
*H01G 4/30* (2006.01)

(52) U.S. Cl.
CPC .............. *H01G 4/18* (2013.01); *C08L 53/025* (2013.01); *C08L 2203/16* (2013.01); *C08L 2203/20* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 9,120,725 | B2 | 9/2015 | Fedurco |
| 9,293,269 | B2 | 3/2016 | Ehrenberg |
| 9,887,042 | B1 | 2/2018 | Ehrenberg |
| 2010/0273901 | A1 | 10/2010 | Ehrenberg et al. |
| 2012/0320497 | A1 | 12/2012 | Ehrenberg |
| 2013/0338244 | A9 | 12/2013 | Ehrenberg et al. |
| 2014/0035540 | A1 | 2/2014 | Ehrenberg |
| 2016/0260545 | A1 | 9/2016 | Pankaj et al. |
| 2017/0022328 | A1 | 1/2017 | Krutzer et al. |
| 2017/0022329 | A1 | 1/2017 | Krutzer et al. |
| 2017/0232853 | A1 | 8/2017 | Lazarev et al. |

OTHER PUBLICATIONS

Gilbert, Chem Rev (1962) 62:549-589. (Year: 1962).*
Benhui Fan et al.,Polymer-based materials for achieving high energy density film capacitors, Progress in Polymer Science 97 (2019).
Mike Lanagan et al., Dielectric Breakdown: Theory, Characterization and its relationship to Energy and POwer Density, Penn State University, Presented at Center for Dielectric Studies Meeting, May 21, 2013.
J. Mcpherson et al., Thermochemical description of dielectric breakdown in high dielectric constant materials, Appl. Phys. Lett. 82, 2121 (2003).
C.K. Chiang et al., Polymer Composites with High Dielectric Constant, Ferroelectrics, 2002, vol. 275, pp. 1-9.
Zulkifli Ahmad, Polymeric Dielectric Materials, Chapter 1.
Sayful Islam MD, Polymer Nano-Dielectrics for High Density Energy Storage, University of South Carolina, Scholar Commons, Theses and Dissertations, Aug. 8, 2014.
Chen< Hongying, "Synthesis and Electrical Properties of Functional Block Copolymer/Inorganic Nanocomposite Materials" (2010). Dissertations. 488.
Takashi Mochizuki et al., Simple, Effective Molecular Strategy for the Design of Fuel Cell Membranes: Combination of Perfluoroalkyl and Sulfonated Phenylene Groups, ACS Energy Letters, 2016.
M. Xie, W. Liu, J. Chen, D. Zhou, X.Liao and R. Sun, Polymer Chemistry, 2016.
Charles E. Sing, et al Electrostatic control of block copolymer morphology, Nature Materials, 2014.

* cited by examiner

*Primary Examiner* — Robert T Butcher
(74) *Attorney, Agent, or Firm* — Christopher Paradies; Paradies Law P.A.

(57) ABSTRACT

A block copolymer forms a dielectric film with isolated polarizable domains. The block copolymer is a molecule selected to have an ionically functionalized end. The ionically functionalized end is selected to be less soluble in a solvent than another portion of the polymer such that, when a plurality of the block copolymer molecules are dissolved in the solvent, the first ends of the plurality of block copolymers interact with each other and aggregate to form isolated polarizable domains. The block copolymer forms an electrically isolating shell about a core comprised of the ionically functionalized ends. One or more additives may be disposed selectively within the core to increase the dielectric constant of the dielectric film.

20 Claims, 11 Drawing Sheets

FIG. 1 (PRIOR ART)

| Materials | Dielectric constant, ε | Materials | Dielectric constant, ε |
|---|---|---|---|
| TiO₂ | 100 | Fluorinated polyimide | 2.5 – 2.9 |
| H₂O | 78 | Methylsilsesquioxane | 2.6 – 2.8 |
| neoprene | 9.8 | Polyarelene ether | 2.8 – 2.9 |
| PVDF | 6.0 | Polyethylene | 2.3 – 2.7 |
| SiO2 | 3.9 – 4.5 | Polystyrene | 2.5 – 2.9 |
| Fluorosilicate glass | 3.2 – 4.0 | Teflon AF | 2.1 |
| Polyimide | 2.8 – 3.2 | Air | 1.02 |

© 2012 Ahmad, licensee InTech. This is an open access chapter distributed under the terms of the Creative Commons Attribution License (http://creativecommons.org/licenses/by/3.0), which permits unrestricted use, distribution, and reproduction in any medium, provided the original work is properly cited.

Zulkifli Ahmad
*University Sains Malaysia, Malaysia*

FIG. 2 (PRIOR ART)

| Material | Dielectric constant (ε') | Loss tangent (tan δ) | Frequency (Hz) |
|---|---|---|---|
| ABS (plastic) | 2.0 – 3.5 | 0.005 – 0.0190 | |
| Butyl rubber | 2.35 | 0.001 | 1 MHz |
| | 2.35 | 0.0009 | 3 GHz |
| Gutta percha | 2.6 | | |
| HDPE | 1.0 – 5.0 | 0.00004 – 0.001 | |
| Kapton (Type 100) | 3.9 | | |
| (Type 200) | 2.9 | | |
| Neoprene rubber | 6.26 | 0.038 | 1 MHz |
| | 4.0 | 0.34 | 3 GHz |
| Nylon | 3.2 - 5 | | |
| Polyamide | 2.5 – 2.6 | | |
| Polycarbonate | 2.8 – 3.4 | 0.00066 – 0.01 | |
| Polypropylene | 2.2 | | |
| Polystyrene | 2.5 – 2.6 | 0.0001 | 100 MHz |
| | | 0.00033 | 3 GHz |
| PVC | 3 | | |
| Silicone (RTV) | 3.6 | | |
| Teflon (PTFE) | 2.0 – 2.1 | 0.0005 | 100 Hz |
| | | 0.00028 | 3 GHz |

© 2012 Ahmad, licensee InTech. This is an open access chapter distributed under the terms of the Creative Commons Attribution License (http://creativecommons.org/licenses/by/3.0), which permits unrestricted use, distribution, and reproduction in any medium, provided the original work is properly cited.

Zulkifli Ahmad
University Sains Malaysia, Malaysia

FIG. 7 Dielectric constant versus frequency for a tri-block copolymer of type 5 cast at 6% solids. Two out of four locations tested shows massively polarizable polymer dielectric behavior with a dielectric constant exceeding 1000.

FIG. 9 Cast film at 50°C. Weight film 2.6g + weight toluene 24g+ingredient x. Autoclave pressure 1 hr. Bath Temp 150°C. Solution was too thick, added ~2ml toluene after releasing the pressure. Place back in oil bath, dwell 3 hrs, at 150°C.

FIG. 10 Cast film at 50°C. Weight film 2.6g + weight toluene 24g+ingredient x. Autoclave pressure 1 hr. Bath Temp 150°C. Solution was too thick, added ~2ml toluene after releasing the pressure. Place back in oil bath, dwell 3 hrs. 150°C.

FIG. 11 Sulfonated Tri-block CoPolymer Type 3. Solution in toluene. Clean solution. Weight film 2.6g + weight toluene 26g. Autoclave pressure 1hr. Dwell 3 hrs. Plate temperature 150°C.

FIG. 12 Same as FIG. 11 showing capacitance solid lines and loss dashed lines.

FIG. 13

(example of triblock copolymer with additives 1-2-3-4, 80 degree C anneal)

FIG. 14

FIG. 15: TABLE OF RESULTS (at 10 mHz)

| Dielectric (x10³) | Anneal | Loss | Capacitance (μF) | Film Quality | Current (amps @ 1V) | Current (amps @ 10V) | Additives |
|---|---|---|---|---|---|---|---|
| 2600-5800 | | 0.82-1.43 | 81 – 190 | PASS | 0.66 e$^{-6}$ | | 1,2,3 |
| 8400-10500 | | 0.84-0.88 | 250 – 330 | FAIL | 0.74 e$^{-6}$ | | 1,2*,3 |
| 678-850 | | 1.6-1.7 | 314 – 422 | PASS | 0.6 e$^{-6}$ | | 2**,3 |
| 0.008-0.144 | | 0.9-3.6 | 0.0005-0.007 | PASS | | | |
| 6600-8600 | | 1.14-1.58 | 232-281 | PASS | | 17 e$^{-6}$ | 1,2,4† |
| 13190-14000 | | 0.67-0.76 | 406-480 | PASS | | 290 e$^{-6}$ | 1,2,4†† |
| 2027-5343 | 120°C | 0.74-1.19 | 78-168 | PASS | | 3.3 e$^{-6}$ | 1,2,4†† |
| 11653-12082 | | 0.82-0.84 | 368-382 | PASS | | | 1,2,3,4 |
| 12077-12732 | | 0.78-0.80 | 349-368 | PASS | 0.260 e$^{-6}$ | 96.7 e$^{-6}$ | 1,2,3,4 |
| 14177-15564 | 80°C | 0.85-1.03 | 410-450 | PASS | - | - | 1,2,3,4 |

Additives:
1. 6% para-Toluene Sulfonic Acid
2. 6% Dodecylbenezenesulfonic Acid
3. 2% Sulforicinolate (Sodium Form – Turkey Red Oil) [*6%, **8%]
4. 8% Poly (tert) ButylStyrene [†12%, ††24%]

Dielectric Constant @ 1 Volt; Additives 1-2-3-4 with 80 degree C anneal

FIG. 16 though its dielectric constant is sufficient for the application. The table of FIG. 2

IONOMERIC POLYMER AND MULTILAYER CAPACITOR AND ADDITIVES

CROSS-REFERENCE TO RELATED APPLICATION(S)

The present application is 371 U.S. national phase application of PCT/US2019/016934 filed Feb. 6, 2019 entitled IONOMERIC POLYMER AND MULTILAYER CAPACITOR AND ADDITIVES which claims the benefit of U.S. Provisional Patent Application No. 62/627,187 filed Feb. 6, 2018 entitled IONOMERIC POLYMER AND MULTILAYER CAPACITOR which are is incorporated herein by reference in its entirety. FIELD OF INVENTION The field relates to dielectric materials, dielectric films and capacitors made using dielectric films.

BACKGROUND

Figure 1:
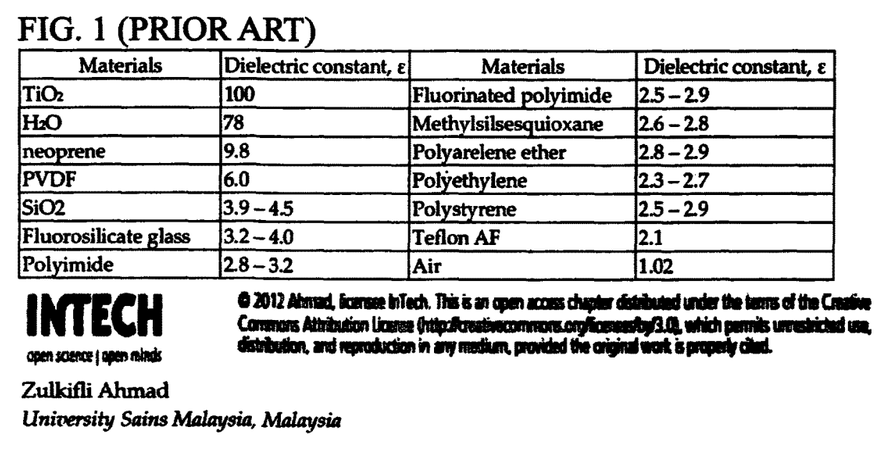
FIG. 1 illustrates a table of some known dielectric constants for some prior art materials.

Dielectric materials are known to be electrical insulators with atoms or molecules that polarize in an electric field. Positive charges associated with an atom or molecule within the material displace in one direction while negative charges displace in the opposite direction, setting up an internal field that reduces the overall field applied to the dielectric material. Some dielectric constants for inorganic materials and polymers are shown in the table of FIG. 1. Dielectric materials are known to be electrical insulators with atoms or molecules that polarize in an electric field. Positive charges associated with an atom or molecule within the material displace in one direction while negative charges displace in the opposite direction, setting up an internal field that reduces the overall field applied to the dielectric material. Some dielectric constants for inorganic materials and polymers are shown in the table of FIG. 1.

Figure 2:
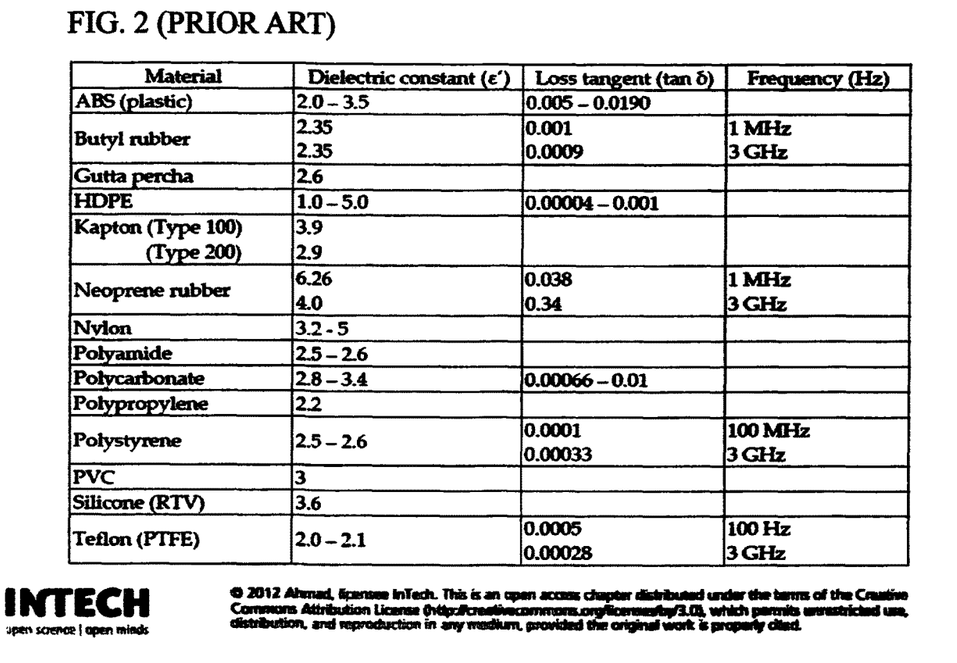
FIG. 2 illustrates a table of some dielectric constants, loss tangents and frequency for some known, prior art materials.
Figure 3:
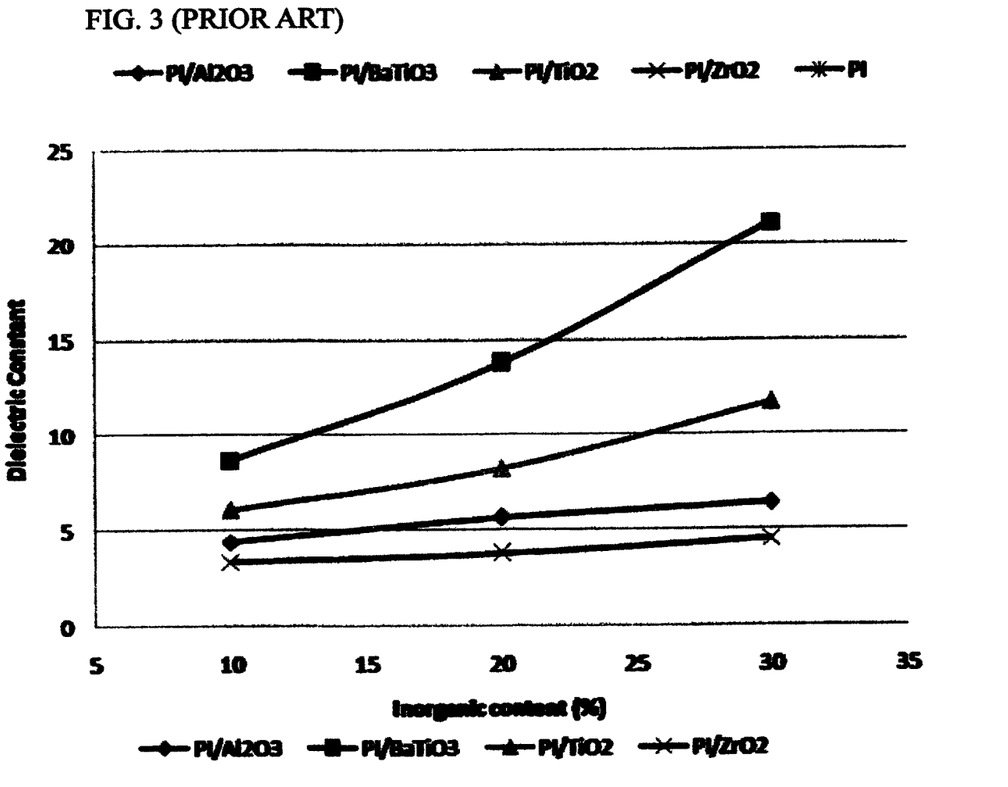
FIG. 3 illustrates a graph of some dielectric constants of some polymer—ceramic composite dielectric materials known in the prior art.

Inorganic materials are known to have higher dielectric constants, but polymers are easier to use, if the dielectric constant is sufficient for the application. The table of FIG. 2 shows dielectric constant, loss tangent and frequency of some materials. Generally, materials that are electrically insulating but having low dielectric constants are used in applications where isolation is required. Materials that are electrically insulating and have comparatively higher dielectric constants may be used as a dielectric in capacitors. Polymers are known to be comparatively low dielectric constant materials. To increase the dielectric constant of a polymer, a high dielectric constant material, such as a ceramic or glass material, may be added to form a polymer composite, as shown in the graph of FIG. 3. [Also see: C. K. Chang and R. Popielarz, "Polymer Composites with High Dielectric Constant," *Ferroelectrics*, 2002, Vol. 275, pp. 1-9.] However, composite materials have issues not found in homogenous high dielectric materials, such as cracking void formation and the like. These shortcomings limit the application of such composite dielectrics.

A dielectric constant (or relative permittivity) is defined as the ratio of the permittivity of a material to the permittivity of free space. A dielectric constant of 1 means that the permittivity is the same as the permittivity of free space (or the vacuum permittivity).

The electric susceptibility, $\chi_e$, of a dielectric material is a measure of how easily it polarizes in response to an electric field, which determines the permittivity of the material. The susceptibility is defined as a constant of proportionality, which may be a tensor, as shown in the following equation, wherein P is the polarization density, E is the electric field and $\varepsilon_0$ is the electric permittivity of free space:

$P=\varepsilon_0\chi_e E$, and $\chi_e$ is the constant of proportionality known as the electric susceptibility. The susceptibility of a dielectric material is related to its relative permittivity, $\varepsilon_r$, by $\chi_e=\varepsilon_r-1$.

The presence of an electric field, E, causes bound charges of molecules in a dielectric material to be displaced relative to each other inducing an electric dipole moment. A displacement field, D, may be defined as:

$D=\varepsilon_0 E+P=\varepsilon_0(1+\chi_e)E=\varepsilon_r\varepsilon_0 E$.

The polarization density is time dependent:

$P(t)=\varepsilon_0\int_{-\infty}^{t}\chi_e(t-t')E(t')dt'$.

The Fourier transform provides a frequency dependence:

$P(\omega)=\varepsilon_0\chi_e(\omega)E(\omega)$.

Displacement in a dielectric material is thought to have a relaxation time. For example, this may be characterized by the following equation for Debye relaxation:

$$\hat{\varepsilon}(\omega) = \varepsilon_\infty + \frac{\Delta\varepsilon}{1+i\omega\tau},$$

where $\varepsilon_\infty$ is the permittivity at the high frequency limit, $\Delta\varepsilon=\varepsilon_s-\varepsilon_\infty$ where $\varepsilon_s$ is the static, low frequency permittivity, and $\tau$ is the characteristic relaxation time. A dielectric loss, tan $\delta$, is defined as the ratio of the and imaginary and real parts of the complex dielectric permittivity.

$$\tan\delta = \frac{\varepsilon''}{\varepsilon'} = \frac{(\varepsilon_s-\varepsilon_\infty)\omega\tau}{\varepsilon_s+\varepsilon_\infty\omega^2\tau^2}.$$

In an atomistic approach to a dielectric model, a material made up of atoms consists of a cloud of negative charges bound to and associated with a positive point charge in the center of the cloud. An electric field distorts the cloud of negative charges resulting in a simple dipole model using superposition principles. A dipole is characterized by its dipole moment, a vector quantity. Removal of an electric field returns the dipole to its original (or relaxed) state. The delay between removal and return of a dipole to its relaxed state is referred to as a relaxation time, $\tau$, which is generally modeled as an exponential decay.

It is generally known that the polarization may be categorized, physically, as dipolar polarization, ionic and molecular distortion polarization, and electronic polarization, with each type of polarization exhibiting a different response to oscillations of the electric field. A dipolar polarization is thought to no longer follow the oscillations of the electric field at about $10^{10}$ Hz; ionic polarization and molecular distortion polarization is thought to no longer follow the oscillations of the electric field at about $10^{13}$ Hz; and electronic polarization no longer follows the oscillations of the electric field at about $10^{15}$ Hz. For frequencies above ultraviolet, permittivity is thought to approach the vacuum permittivity $\varepsilon_0$ in every material substance, where $\varepsilon_0$ is the permittivity of the free space. Because permittivity indicates the strength of the relation between an electric field and polarization, if a polarization process loses its response, permittivity decreases.

Chih-Chien Hung, Hung-Chin Wu, Yu-Cheng Chiu, Shih-Huang Tung, and Wen-Chang Chen, "Crosslinkable High Dielectric Constant Polymer Dielectrics for Low Voltage Organic Field-Effect Transistor Memory Devices," *Journal of Polymer Science*, 1 Jul. 2016 reported "high" dielectric constants for copolymers from 6.47 (P1) to 4.91 (P4), which were only useful at comparatively low voltage (i.e. less than 6 Volts).

Recently, the applicant has discovered high dielectric polymers that operate in a new and distinct way from previous dielectric materials with dielectric constants greater than 1000 at certain frequencies. It is believed that these polymers form electrically isolated ionomeric domains distributed throughout a dielectric film. However, these "micelles" or "isolated ionomeric domains" may assemble in nearly spherical domains or as rods or other morphologies. In fact, these materials may establish conductive ionic pathways that make these materials unsuitable as dielectrics. However, it is believed that spherical domains may be formed by certain block copolymers that preferably form films with predominantly spherically oriented isolated polarizable domains, which may be useful as capacitive energy storage devices.

No information on additives useful as plasticizers, polarizable molecules, insulators and combinations of these is available for this new class of polarizable dielectrics.

SUMMARY

A polymer dielectric film forming material has an ultra-high dielectric constant, greater than 100, and capable of use at a high voltage, wherein a "high voltage" is defined herein as at least 10 Volts. In another example, the dielectric films are measured having dielectric constants at 1000, 10,000, 100,000, 1,000,000 or even 10,000,000, at some frequencies, such as at frequencies less than 1 Hz. Surprisingly, when impurities are controlled and certain additives are mixed with a polymer exhibiting isolated ionomeric domains, both the frequency and the dielectric constant may be modified. For example, a dielectric greater than 100,000 may be obtained at frequencies greater than 10 Hz, and a dielectric constant greater than 10,000,000 may be obtained at frequencies greater than 1 Hz. Even more surprisingly, these high dielectric constants are maintained or even increased as the voltage across a capacitor made using the film is increased. At voltages greater than 6 volts, the dielectric constant may be greater than 10,000,000 at 10 Hz, for example. This is beyond surprising and unexpected. Capacitors made using this new class of materials, for the first time, are capable of energy density and. For example, the material has been synthesized and tested as a dielectric film between capacitor electrodes and exhibits dielectric properties exceeding 1,000,000 when certain additives are added to the material prior to forming of a film. These polymers are thought to be among the best examples of efficient massively polarizable (EMP) polymer dielectrics. In one example, the material exhibits self-assembly of isolated, polarizable domains within a polymer matrix with exceptionally high dielectric properties and high bulk resistance. In some examples, films achieve low leakage currents, providing a dielectric material for an energy storage capacitor that yields energy density and power density not know in the art. It is thought, without being limiting, that the process for synthesizing EMP polymers from solution benefits from using a solvent, wherein a polarizable, functionalized polymer segment is less soluble in the solvent than one or more other segments of a copolymer, which may tend to form clusters of isolated ionomeric domains within the polymer. In one example, additives surprisingly and unexpectedly synergistically increase capacitance, dielectric properties and isolation of polarizable domains. Without limiting the invention, some additives may influence the self-assembly, providing more isolated, ionomeric domains. Other additives having ionic potentials that are disposed at the isolated domains and contribute to the fields of the isolated domains, increasing the dielectric constant. Still other additives add a non-conductive film in and/or around the isolated domains, reducing leakage current and/or increasing bulk resistance.

In one example, a dielectric film comprises a block copolymer, wherein the block copolymer is a molecule that has a first end and an opposite end, and the first end is coupled to opposite end; and the first end is ionically functionalized and is selected such that the first end is less soluble in a solvent than the opposite end of the block copolymer, such that when a plurality of the block copolymer molecules are dissolved in the solvent, the first ends interact with each other, aggregated and form isolated polarizable domains. A middle block may couple the first block to the opposite block, for example. The middle block may be selected to provide flexibility, allowing the opposite block to cooperatively form an electrically isolating shell about a core comprised of the first block and/or one or more additives disposed selectively within the core.

For example, additives such as pTsa, sulfuric acid, dodecyl benzene sulfonic acid, benzene sulfonic acid, 2,5-Diamino benzene sulfonic acid, 4-amino benzene sulfonic acid, 5-aminobenzene-1,4 disulfonic acid, carboxylic acids, tertbutylstyrene polymer at a molecular weight selected in a range from 25,000 to 200,000, and turkey red oil have been added within a solution comprising a block copolymer and a solvent such as toluene. Some of these additives showed surprising and unexpected results.

In one method, the EMP polymers are autoclaved at a pressure above 1 atmosphere (atm.) and at a temperature greater than room temperature. For example, a range of pressures from 3 to 10 atm. or 5 to 8 atm. In one example, the solution is brought to 8 atm for 1 hour, then decreased to six atm for 30 minutes, then decreased to 4 atm for 30 minutes, then 2 atm for 30 minutes and then one atm for one hour. While adjusting the pressure, the solution temperature may be maintained at a temperature range below the boiling point of the solvent at the pressure in the autoclave. A higher temperature may be useful in solvating molecules that have difficulty in solubilizing at lower temperatures, and keeping the temperature less than the boiling point of the solvent reduces the need to add additional solvent during autoclaving. As the pressure and temperature are lowered, it is believed that less soluble segments arrange into one or more morphologically isolated domains. In one example, one or more additives are added to the block copolymers and solvent to aid the process that drives the precipitation of isolated polarizable domains. One class of additives may add polarizable molecules increasing dielectric properties. Another class of additives may plasticize the polymers and prevent crystallization of polymers within isolated polarizable domains. Yet another class of insulative additives may increase the bulk resistance and result in less leakage current. It is thought, without being limiting in any way, that one or more of the additives may impact the formation of isolated polarizable domains such that the domains preferentially form more spherically isolated domains, rather than more extended morphologies, such as rods or the like.

For example, one EMP polymer has a middle portion of a block copolymer that is functionalized, such as by sulfonation, methylation or ammonization. For example, a penta-block copolymer may comprise a first block, such as a comparatively long butyric acid based polymer block, which is selected to electrically isolate a polarizably functionalized block. For example, a polytertbutylstyrene may be an electrically isolating block. A second block, coupled to the first block at a first end of the second block, may comprise a flexible block, providing for the penta-block polymer to bend at this comparatively flexible block. The second block may be coupled at a second end, opposite of the first end, to the third block, which may be the polarizably functionalized block. The polarizably functionalized block may be comparatively shorter than the other blocks. In one example, the length of the polarizably functionalized block is selected to control the self assembly of the penta-block copolymer, such that isolated domains precipitate while in solution, prior to forming of a polymer film, for example. The remaining blocks of the penta-block copolymer may repeat the second and first block. For example, the sequence of the blocks may be first block, second block, third block (e.g. the polarizably functionalized block), second block, first block.

Alternatively, a triblock polymer may comprise a first block, a second block and a third block, wherein the first block is of an electrically isolating polymer, the second block is of a comparatively flexible polymer and the third block is a polarizably functionalized block. The length and functionalization of the third block may be selected such that the isolated domains precipitate while in solution, prior to forming a polymer film and during a hold time in the autoclave, for example.

Even if the correct polymer structure of the blocks are selected, an efficient massively polarizable polymer dielectric will not result without the proper synthesizing of the polymer from solution. It is thought, without being necessarily limiting, that an optimum residence time within a range of temperature and at a pressure is desirable to ensure that the polymer forms isolated clusters of polarizable functionalize blocks, preferably before forming of the film. The residence time, percentage of polymer within the solvent, temperature and pressure depends on the type of solvent used, the presence or absence of other constituents within the solvent, the relative solubility of the polarizably functionalized block compared to the other blocks, the relative size of the blocks, the degree of functionalization of the polarizably functionalized block, the number and size of blocks in the block copolymer and the type of process chosen for forming the polymer into a useful form. For example, if the polymer is deposited as a film using spray deposition, then it may be advantageous to hold the polymer at a percent solids, temperature and pressure such that the block copolymer precipitates isolated polarizable domains prior to spray deposition. On the other hand, if film forming using a knife to spread a layer of the polymer and more slowly evaporating the solvent, then isolated polarizable domains may be precipitated after the film is deposited on a substrate, for example. Regardless, sufficient time must be permitted for isolated polarizable domains to be distributed throughout a film or layer before all of the solvent evaporates locking the isolated polarizable domains within the polymer matrix.

Manufacturing consistent, homogenous, efficient massively polarizable polymers requires some care. Impurities in the synthesis of the block copolymers or the functionalization process may impair the formation of discrete, electrically and physically isolated, massively polarizable domains during the self-assembly process. Also, both simulation and experimentation have shown that there may be a maximum relative length of the polarizably functionalized block that allows for the clustering of the polarizably functionalized blocks into isolated domains during self-assembly and formation of massively polarizable polymer dielectric films. However, this may be adjusted by the addition of certain additives to the solution prior to casting.

In one example, a polarizably functionalized block comprising a length 20% of the length of the block copolymer resulted in complex, interconnected structures and did not result in a physically and electrically isolated polarizable domains. While these complex, interconnected structures exhibited some polarization, leakage currents were excessive. For example, a polarizably functionalized block comprising a length of about 6% to 9% exhibited physically and electrically isolated massively polarizable domains, when conditions favoring self-assembly of massively polarizable domains were selected.

In one example, a process for sulfonating the block copolymers that limits impurities and purification of the polymers prior to casting resulted in some isolated massively polarizable domains. However, by adding in some additives to the solution prior to casting, films formed subsequently exhibited much higher dielectric properties. Surprisingly, these additives increased the energy density and power density of capacitors made from the dielectric polymers that form isolated polarizable domains by orders of magnitude greater than films cast without these additives. It is thought, without being limiting in any way, that some additives may contribute to the formation of isolated domains that are more or less spherical and evenly distributed throughout a film. Some of these additives are isolation enhancers. Other additives may inhibit crystallization within the film or may plasticize or lubricate regions in or near the isolated domains, affecting the response of the polarizable domains to a change in voltage. Some additives may add polarizable molecules to the isolated polarizable domains.

BRIEF DESCRIPTION OF THE DRAWINGS

The following drawings are illustrative examples and do not further limit any claims that may eventually issue.

When the same reference characters are used, these labels refer to similar parts in the examples illustrated in the drawings.

DETAILED DESCRIPTION

This detailed description discloses examples of massively polarizable polymer dielectric films synthesized using a blade to draw a film. In one example, a block copolymer forms a dielectric film with isolated polarizable domains. The block copolymer is a molecule comprised of at least one ionically functionalized end. The ionically functionalized end is selected to be less soluble in a solvent than another portion of the polymer such that, when a plurality of the block copolymer molecules are dissolved in the solvent, the first ends of the plurality of block copolymers interact with each other and aggregate to form isolated polarizable domains. The block copolymer forms an electrically isolating shell about a core comprised of the ionically functionalized ends. One or more additives may be disposed within the core to increase the dielectric constant of the dielectric film.

Capacitors were formed by sputtering gold on the opposite sides of films formed from these block copolymers. For example, a film was formed by depositing a solution containing the block copolymers on a metallization layer. The solvent evaporates to form a polymer film. Then, sputtering a metal film on the opposite side of the film from the metal electrode provides an anode and cathode for a capacitor, sandwiching the film to be tested between the metal electrodes. Films were formed that achieved voltages greater than 6 Volts, more preferably greater than 10 Volts, and still yet even more preferably greater than 20 Volts, yet even more Preferably greater than 50 Volts and still yet even more preferably greater than 100 volts. These levels of voltages are extremely surprising and unexpected for polymer dielectric capacitors. By polymer dielectric capacitors, it is meant that the dielectric constant is attributable to the polymer (and its discrete, isolated domains of self-assembled, clustered, and polarizably functionalized blocks) and any residual ionumeric molecules associated at the relevant clusters, and is not attributed to any ceramic or other composite additions. These polymer films are fundamentally different than polymer composite films that incorporate significant additions of ceramic or other high dielectric particles. The polymer and molecules associated with the polymer within the isolated clusters that form in the film, and it is these isolated clusters that provide for the dielectric polarization. The number and density of the clusters is extraordinarily great and result in internal fields that offset external fields of tens or hundreds of volts with low leakage currents. It is believed that the density and distribution of these centers prevents damage to the polymer, because the field experienced by each cluster is quite small, even though the field across the capacitor can be quite large.

Figure 4:
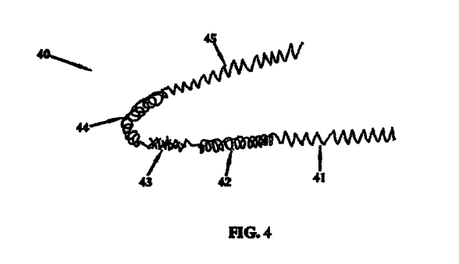
FIG. 4 illustrates a schematic example of a penta-block copolymer massively polarizable polymer dielectric.

Type 1 Example. A type 1 polymer was synthesized as a penta-block copolymer 40, such as schematically illustrated in FIG. 4, for example. The first block 41 may be a butadiene-styrene block or a butyl-styrene block or the like. For example, a butadiene-sulfonated-polystyrene block may comprise 30% to 70% of the copolymer's molecular weight. The second block 42 may be a comparably flexible polymer block, such as an isoprene, with a molecular weight in the same range as the first block, for example. The third block 43 may be polarizably functionalized block, such a sulfonated styrene, for example. In the type 1 example, the sulfonated styrene block was selected to a molecular weight such that 20% or less of copolymer is of the sulfonated styrene. The remaining two blocks, the fourth block 44 and fifth block 45 may be the same composition as the second block and the first block, respectively, or may have a different composition or length. Generally, the block copolymer comprises a comparatively stiff, electrically isolating block, a comparatively soft, flexible block coupled to the stiff, electrically isolating block, a polarizably functionalized block coupled to the soft, flexible block, another soft, flexible block couple to the polarizably functionalized block and another hard, electrically isolating block coupled to the soft, flexible block. Several commercial variants of these types of copolymers exist, although the specific, relative block lengths did not prove suitable for producing isolated, polarizably functionalized domains. For example, U.S. Pat. Publ. 2017/0022329 describes such a pentablock copolymer emulsion. Leakage currents suggested that the structure of the polymer was a complex, non-isolated network of sulfonated polystyrene domains. Nevertheless, some polarization of domains was exhibited by these materials when processed in a way that limited complex, non-isolated networks as much as possible, but the use of commercially available polymers was deemed a failure.

As a result, custom block copolymers that are not commercially available were requested. One such block copolymer was triblock copolymer.

Figure 5:
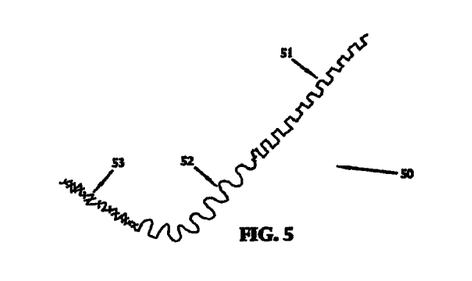
FIG. 5 illustrates a schematic example of a tri-block copolymer massively polarizable polymer dielectric.

Type 2 Example. A type 2 polymer was synthesized as a tri-block copolymer 50 comprising a first block 51, such as a 14 kg/mole T-butyl block, a second block 52, such as a 14 kg/mole Ethylene-Butylene block, and a third block 53, such as a Styrene block, wherein the Styrene block is coupled to the T-butyl block by the ethylene-butylene block of the tri-block copolymer. For example, the styrene block was selected to be 7 kg/mole. It is thought that the specifics of the blocks were not critical to the effectiveness or ineffectiveness of these custom block copolymers. Instead, the idea was to create block copolymers that would have a comparatively hard, electrically isolating block on one end 51, a comparably soft, flexible middle section 52, and a polarizably functionalized opposite end 53, wherein the polarizably functionalized opposite end would tend to be less soluble in a particular solvent, such as toluene, than the opposite end of the block copolymer. While polarizable, this block copolymer with a 7 kg/mole sulfonated styrene block assembles in complex assemblies of molecules that do not form discrete, isolated domains. By discrete, isolated domains, it is meant to convey that the domains comprise clusters of polarizably functionalized blocks, which in this case would have been sulfonated styrene blocks, physically and electrically isolated from neighboring clusters of polarizably functionalized blocks. This did not reliably occur when the sulfonated styrene block comprised 20% of the molecular weight of the molecule, regardless of the processing conditions.

Figure 6:
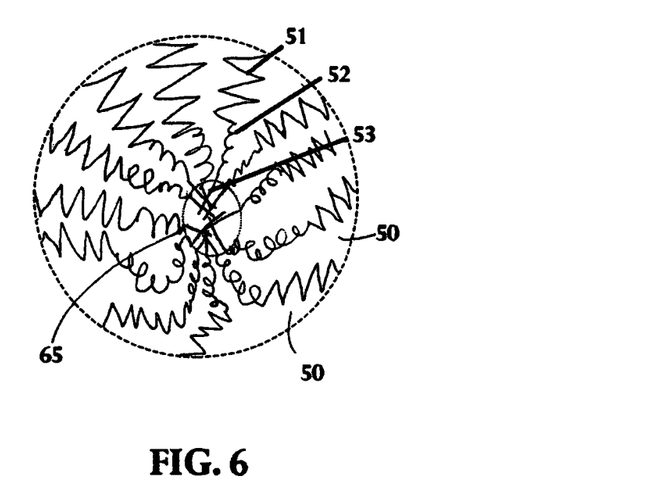
FIG. 6 illustrates, schematically, a 2-D figure showing a physically and electrically isolated cluster of massively polarizably functionalized block of a block copolymer.

Type 3 Example. A type 3 polymer was synthesized as a tri-block copolymer 50 comprising a first block 41, such as a 15 kg/mole T-butyl-styrene block, a second block 52, such as a 13 kg/mole Ethylene-Propylene block, and third block 53, such as a styrene block, wherein the Styrene block is coupled to the T-butyl block by the ethylene-butylene block of the tri-block copolymer. Again, the specifics of the blocks are not deemed critical to a successful copolymer. Instead, the functional characteristics of the blocks were selected, as disclosed previously. In this example, the styrene block was selected to be less than 7 kg/mole. For example, 3.6 kg/mole and 2.4 kg/mole were tested, such that the percentage of styrene molecular weight was no greater than 12% of the total molecular weight of the molecule. For example, the percentage of the styrene blocks may be from 6% to 12%. The percentage of the styrene block to the molecular weight of the molecule was selected to be less than 20%. Several variants were tested at molecular weights from 6% to 9%, which are capable of forming massively polarizable, isolated clusters of sulfonated styrene blocks, when appropriate processing conditions are chosen for solubilizing the polymer in a solvent, such as toluene, which results in the preferred dissolution of the T-Butyl and Ethylene-Butylene blocks and forms clusters of isolated domains during self-assembly and exhibited cast films that were massively polarizable. For example, FIG. 6 shows schematic of a 2-D representation of an isolated cluster 65 (inner dashed lines) of polarizably functionalized blocks 53 (represented by straight lines) of block copolymers 50, having a first block 51 and a second block 52, more flexible than the first block 51. The outer perimeter of the assembly of block copolymers is represented by a dashed line 69, notionally. Neighboring first ends 51 of block copolymer 50 assemblies would likely be interspersed between these first blocks 51.

Figure 7:
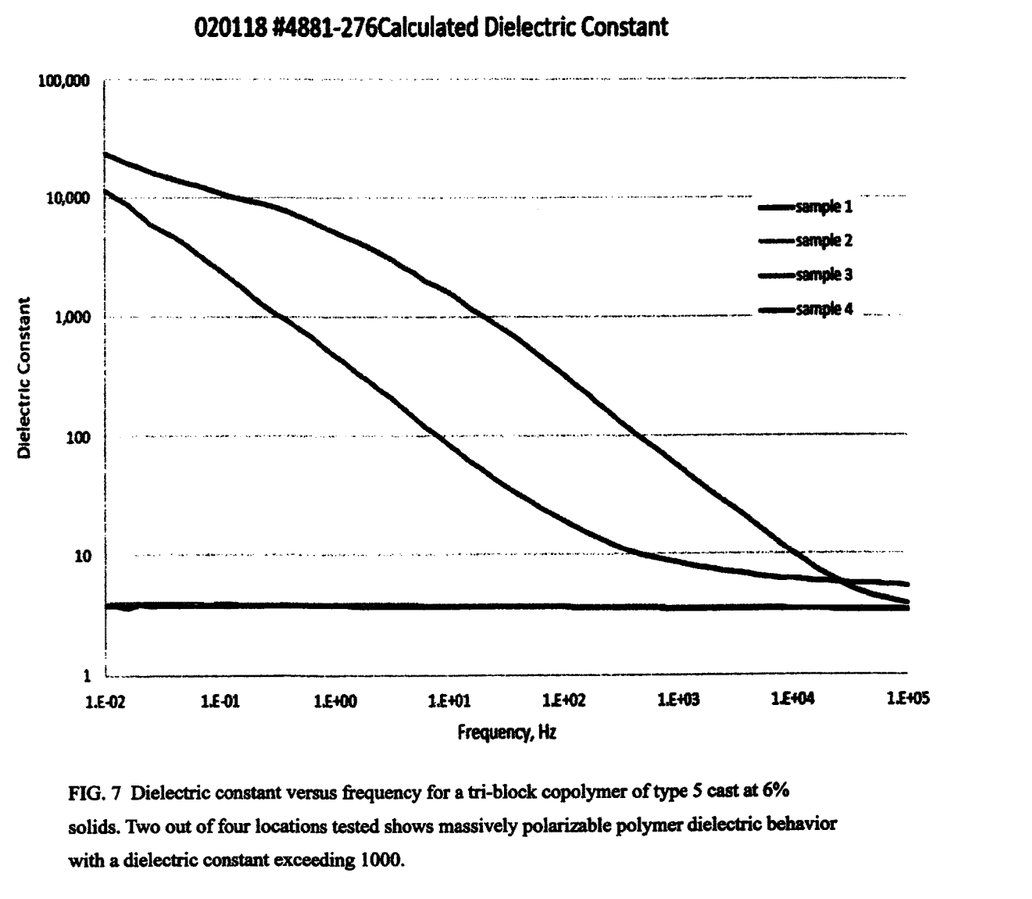
FIG. 7 illustrates a graph showing the results from a massively polarizable polymer dielectric capacitor for a type 3 block copolymer.

By massively polarizable, it is meant that a dielectric constant of at least 1000 is achieved when gold is deposited on opposite sides of the film and a test is performed according to the graph illustrated in FIG. 7.

In one example, the block copolymer may be synthesized in a heptane-cyclohexane solvent with or without other solvents, such as alcohols and the like to control the reaction rate and to quench the reaction when the process is complete, for example. The processes for creating block copolymers of this type are known in the art and disclosed in prior art patents; however, the specific ratios of the lengths and sizes of the polymers are not disclosed in the prior art.

In one example, a sulfonated agent is an acetyl sulfate. In another example, a sulfur trioxide may be used as the sulfonating agent. Preferably, a process that sulfonates is designed to produce a clean sulfonated polymer without detrimental impurities. Then, the polymer does not need to be cleaned of impurities prior to adding additives and autoclaving the resulting mixture of polymer, solvent and additives. In one example, the sulfonated polymer is precipitated from a solvent following or during sulfonation. The solvent may be removed prior to dissolving the sulfonated polymer in a different solvent. For example, the sulfonated polymer may be spray dried to remove the solvent. In one example, the polymer is spray dried in a dry nitrogen or dry argon to prevent contamination of the polymer with water or other impurities.

If spray drying or any other process is used to create a solid polymer powder or film, then the polymer may be dissolved again in the same or a different solvent prior to forming a dielectric film. The solvent may be selected in which a portion of block copolymer remains in solution more readily than another portion of the block copolymer. In this way, for example, an ionomeric portion of the block copolymer may begin to assembly into isolated polarizable domains during precipitation of the block copolymer from solution prior to full precipitation of the block copolymer from solution. During processing and forming of a film, agitation, temperature, pressure, the comparative length of the ionomeric block of a block copolymer, the percentage of sulfonation and percent solute dissolved in the solvent may be adjusted to result in a desired morphology of the block copolymers and any additives within a film. By utilizing an autoclave, the pressure, temperature and percent solids of a solution may be managed during the process to dissolve the polymer in a solvent, to break up precipitates and agglomerated block copolymer strands suspended in the solvent, and to precipitate the solute in a process that self assembles, in situ, as dielectric material. The process used and additives chose determine whether or not isolated, polarizable domains are formed within the material. In some examples, no evidence of polarizable domains was achieved. In others, extraordinary and surprisingly effective polarizable domains resulted in dielectric films capable of being used to create high energy density and high power density capacitors exceeding the values achievable even by liquid fuels. This is very surprising and unexpected, especially when the only processing necessary is to metalize the surface of the films or to cast or spray the films directly onto an electrically conductive electrode. In one example, a film is cast on an electrically conductive electrode, such as a conductive film, plate, ribbon or the like. Then, another electrode may be sputtered or otherwise deposited onto the opposite side of the film to produce a surprisingly effective energy storage device. In one example, a film formed on a first conductive electrode is paired with a film formed on a second conductive electrode with the faces of the film opposite of each respective electrode being facing each other. For example, a temperature, solvent content and pressure between the surfaces may be adjusted during pairing of the films to produce a contact interface between the films that reduces defects at the interface. In one example, the paired films are fed through a roller or rollers. The roller or rollers may be maintained in a preferred temperature range and/or a heater may be used to maintain the electrodes and film within a particular temperature range during pairing. The temperature may be selected to be warm enough to allow the interfaces of the films to join together while not being too warm such that the isolated polarizable domains are damaged or degraded. In practice, this temperature range may be determined by trial and error depending on when the polymer becomes tacky, softened and melts. Melting disorganizes isolated polarizable domains. Softening may degrade isolated polarizable domains if too much pressure is applied during pairing. A tacky or pre-tacky condition may provide an acceptable bond between the paired films without degrading the performance of the isolated polarizable domains. A preferred temperature range may be from a nearly tacky temperature to the softening temperature of the particular block copolymer used as the backbone that provides the matrix isolating the isolated polarizable domains.

Additional solvent may be added or evaporated from the solutions to adjust the percent solid solute solvated by a particular solvent. In one example, the solution is held at a temperature and pressure for a hold time and may be stirred to ensure dissolution of solute in the solvent. Additives may be added to the solution before, during or after the initial hold depending on the temperature and pressure desired for dissolution or suspension of certain additives mixed within the solution.

Figure 8:
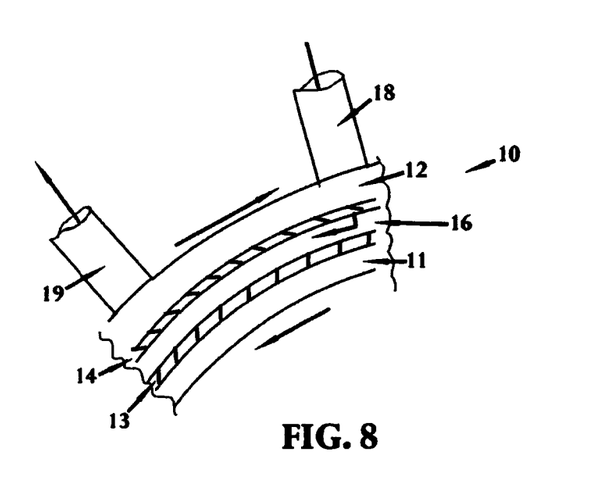
FIG. 8 illustrates a partial cross-sectional view of a relevant portion of a high shear rate reactor.
Figure 9:
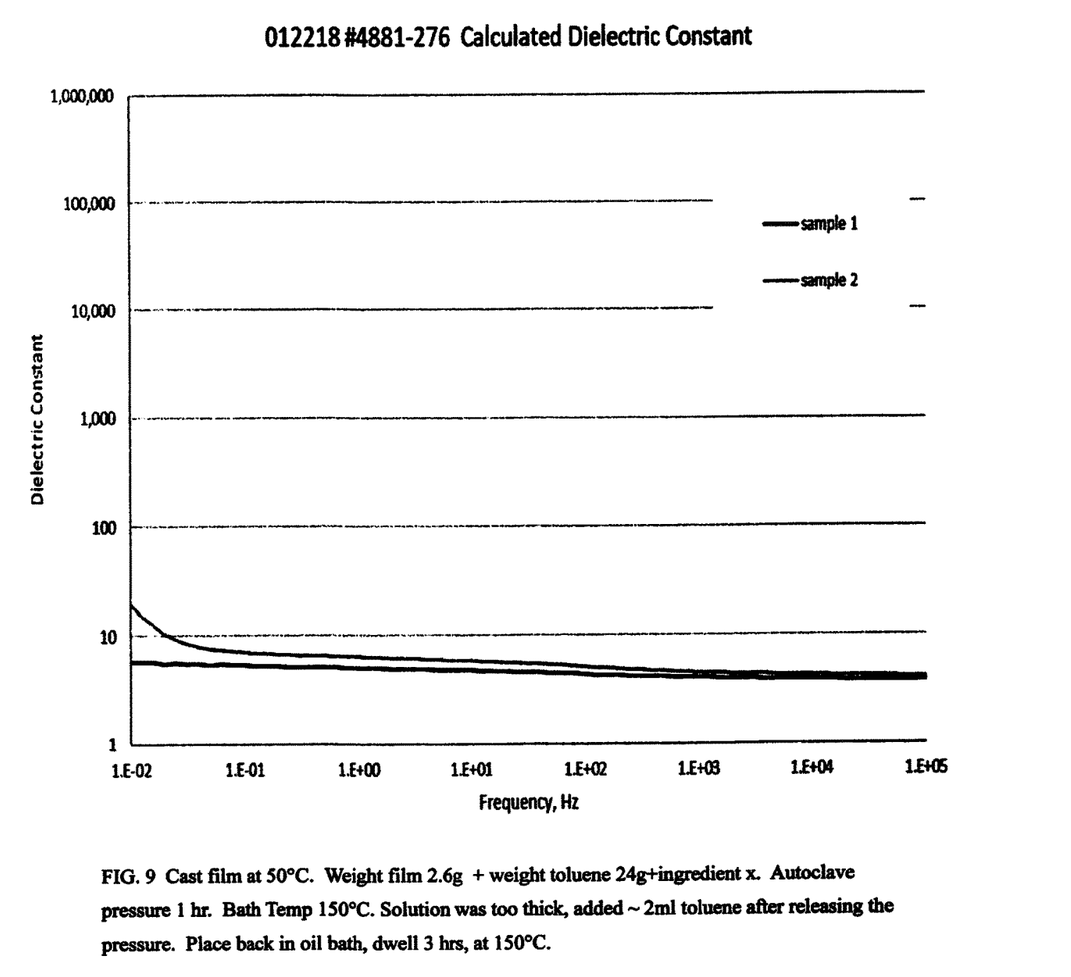
FIG. 9 illustrates another graph showing dielectric constant versus frequency.
Figure 10:
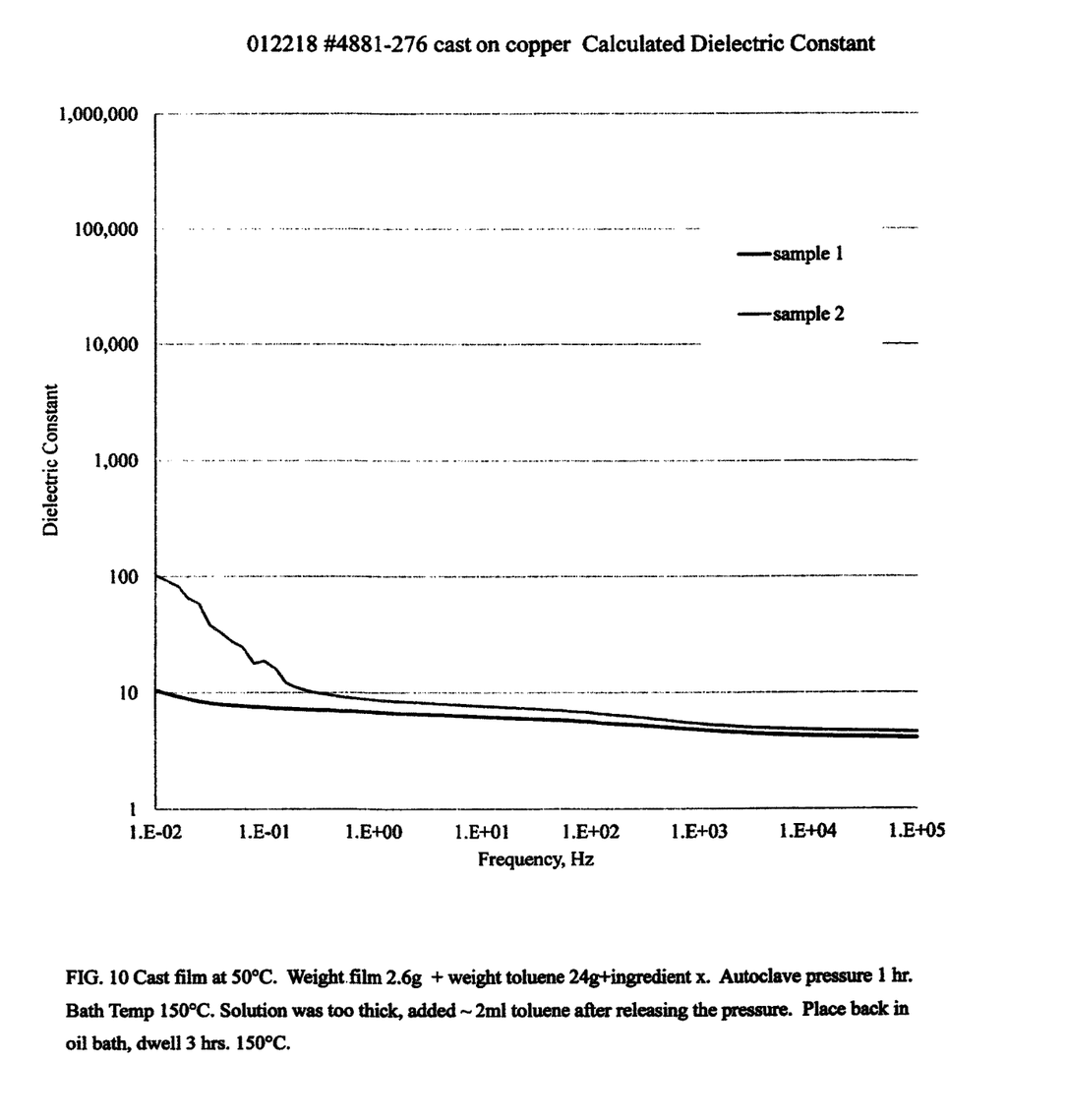
FIG. 10 illustrates another graph showing dielectric constant versus frequency.

In one example, a continuous process is performed. For example, a process may be performed above atmospheric pressure and at temperatures greater than 20 degrees centigrade, more preferably no less than 40 degrees centigrade, accelerating reaction kinetics within the solution. A continuous process may employ shear rates to constantly mix and react consituents during functionalization of the polarizably functionalized block. For example, the block may be sulfonated in a high shear rate reactor 10 comprising a rotating inner 11, 13 and/or outer 12, 14 tube and a gap 16 between the inner and outer tube that results in shear rates sufficient to rapidly sulfonate the polarizably functionalized block. Alternatively, a high rate of shear may be introduced by vigorous stirring, and the rate of the functionalization may be determined by the reaction kinetics, temperature and stirring rate. In one example, a rotating glass coated 13 cylinder is disposed within a glass lined 14 tube where the clearance 16 between the cylinder and the tube is few thousandths of an inch. At modest rotational velocities, shear conditions in the 10 ^5 cubic inch range may be produced, for example. A number of reactants may be introduced into an inlet 18 to sulfonate or aminate the polymers, for example, before the functionalized polymer exits a downstream outlet 19, as illustrated in FIG. 8. A stoichiometric ratio of reactant to polymer or near stoichiometric, may be employed, because the high reaction kinetics complete the reaction without higher stoichiometric ratios that would be necessary for less efficient mixing and heat removal. Controlling the removal of any heat produced by the reaction may be achieved to prevent "burning" of the polymer during the functionalization reaction. This has advantages over employing higher stoichiometric rations, because non-stoichiometric impurities do not have to be removed from the solution prior to casting massively polarizable polymer films. Employing stoichiometric ratios also allows for fine control of the molar percent conversion of the reactant moieties within the polymer. For example, a high percentage of the sulfonation sites on a block of the block copolymer that needs to be sulfonated may be achieved in a high shear rate reactor. For example, it is much easier to create a dielectric film with a dielectric constant greater than 1000 and low leakage current when sulfonation is at least 90% complete, more preferably at least 95% complete, even more preferably at least 98% complete. In one example, more than 99% of the sulfonation sites of the block to be functionalized are functionalized, such as by sulfonation, using a high shear rate reactor.

In one example, the process comprises: (1) dissolving polymers and reactant in compatible solvents, (2) injecting polymer and reactants into the space between the rotating cylinder and tube at appropriate pressure and temperature conditions (e.g. determined by routine experimentation for polymer and reactants choices), (3) collecting reacted solution downstream of the injections points (e.g. distance determined by reactor design and shear rates), (4) spraying reacted solution into warm nitrogen gas flow to evaporate solvent and produce spray dried powder, and (5) chilling solvent laden nitrogen flow to recover solvent for reuse in the reactor and/or disposal.

The process produces homogeneous massively polarizable block copolymers that may be dissolved in a solvent of choice at a favorable temperature and pressure. For example, toluene has been used to dissolve massively polarizable block copolymers at temperatures above 20 degrees centigrade and pressures above atmospheric pressure. In one example, a sulfonating agent was selected as a SO3/Dioxane sulphonating agent for a triblock copolymer of type 3.

For example, polymers were held for several hours prior to casting at atmospheric pressure on a substrate at a temperature above 20 degrees, which resulted in massively polarizable isolated clusters in a massively polarizable polymer dielectric with a dielectric constant greater than 1000. In one example, the holding temperature was between 40 and 60 degrees centigrade and the casting temperature was between 40 and 60 degrees. The pressure used may be determined by routine experiment by determining when a solid polymer dissolves in solution. The pressure may be held at the pressure just above that necessary to dissolve the solid polymer (e.g. fragments or powder) within the solvent chosen, for example toluene in the case of the sulfonated block copolymers of the examples.

Figure 11:
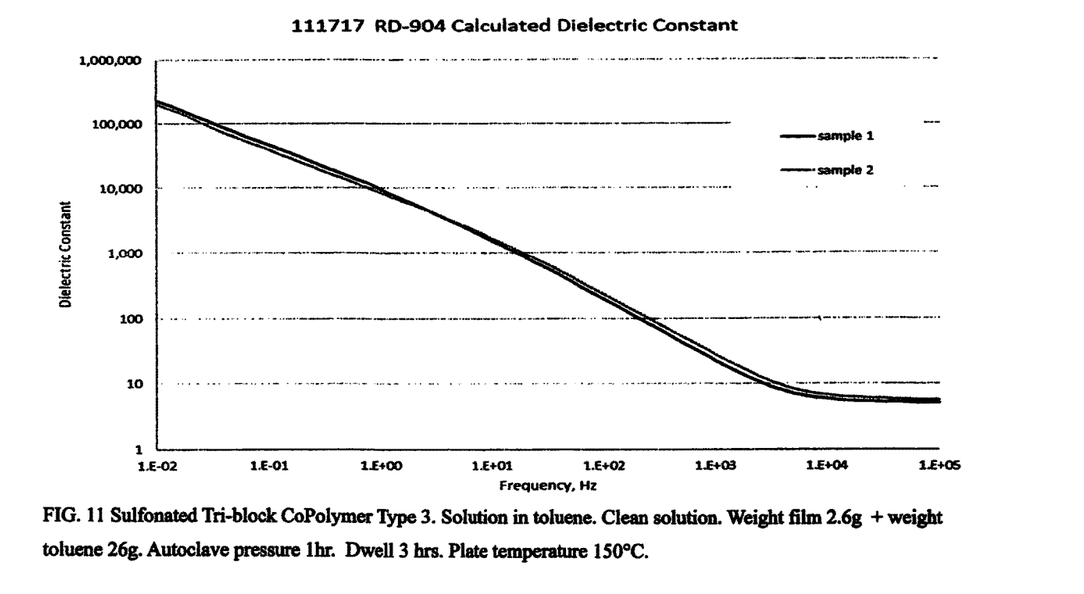
FIG. 11 illustrates another graph showing dielectric constant versus frequency for a type 3 block copolymer.
Figure 12:
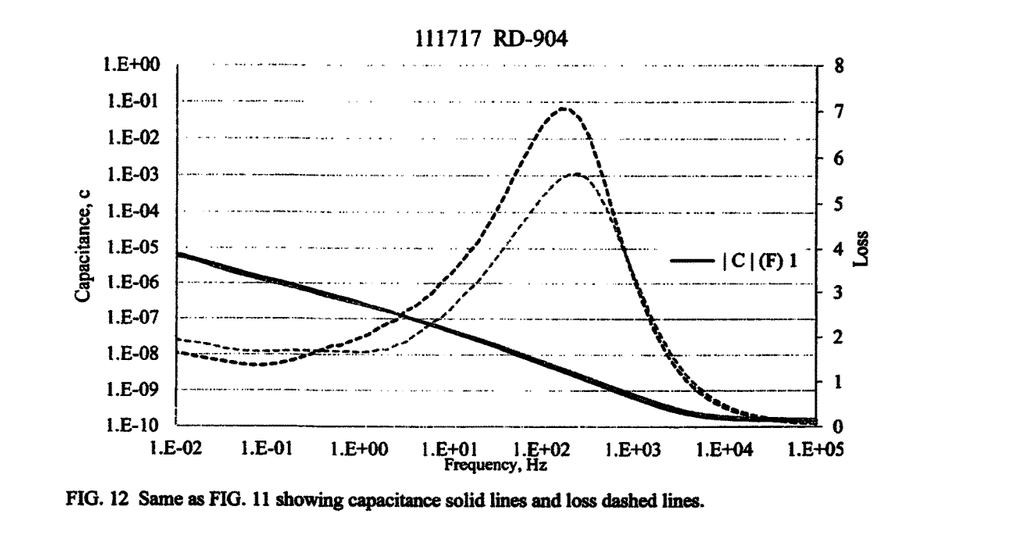
FIG. 12 illustrates a graph of capacitance and loss for a capacitor made from a film with a dielectric shown in FIG. 1.
Figure 13:
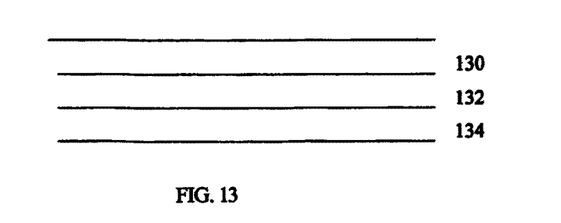
FIG. 13 illustrates a schematic representation of a multi-layer capacitor with an anode 130, a dielectric layer 132 and a cathode 134.

FIGS. 7 and 9-11 illustrates various examples for differing processing conditions. Results vary depending on processing conditions with cleaner synthesis and proper temperature, holding times and casting temperatures being selected based on NMR analysis, x-ray and molecular simulations for determining when and at what temperatures and pressures clusters form. FIG. 11 shows repeatable results with type 3 polymers.

In one example, the polymers were first purified either by removing impurities or by changing the process of manufacture to reduce impurities or both. Then, additives were added to the solvated polymers prior to film forming. For example, the additives may be added prior to processing a solution of the polymers and a solvent in an autoclave. The following are some examples of additives useful in making dielectric films for EMP capacitors. One or a combination of the following additives may provide surprising and unexpected improvements in dielectric properties and bulk resistance.

In one example, a dodecylbenzenesulfonic acid may be added to perform as a mid-block plasticizer for the near ionic cluster region. The acid moiety attached to the end of the long carbon chain means that this molecule may be expected to be polar. It is thought that the acid moiety locates the molecule at the ionic cluster/mid-block interface with the long carbon chain (the oily part) extending into the mid-block region. This may have the effect of plasticizing the near ion cluster region of mid-block, making it less likely that an isolated domain will form as an extended structure or rod-shaped domain. In some early experiments, rod-shaped and more complex morphologies were identified, especially when the polarizable end of a tri-block copolymer was greater than 10% of the molecular weight of the block copolymer. Spherically isolated polarizable domains are highly favored for use of these new materials as a dielectric separator. A near ion cluster region of a mid-block may allow the attached ionic block to shift position when an external field is applied, which is thought to contribute to cluster polarizability and dielectric properties. In one example 6 weight % (wt %) of dodecylbenzenesulfonic acid to 94 wt % of the polymer works well. Alternatively, a range of additive may be added to the polymer from 5 wt % to 10 wt %, more preferably 6 wt % to 8 wt %.

In one example, para-Toluene Sulfonic Acid (pTsa) may be an example of an ionic filler for isolated polarizable domains. In one example, pTsa is produced in situ as a residual reagent during the functionalization of the polymer. For example, during one sulfonation process, a substantial amount of pTsa remained. This additive, whether formed in situ during functionalization or added afterwards may contribute charge density to ionic clusters within a block copolymer film, which may enhance polarizability. It is thought that pTsa may crystallize when the solvent evaporates under some circumstances, and pTsa may contribute to polarization losses or leakage currents, especially at steady voltage conditions as voltage across a capacitor incorporating the film increases. In one example, 6 weight % of pTsa was added to the polymer and both were dissolved in toluene at a temperature and pressure greater than ambient. Experiments achieved surprising and unexpected dielectric properties utilizing pTsa in a range from 3 wt % to 8 wt % of pTsa to block copolymer. Above 8 wt % pTsa, crystals formed that apparently degraded film performance. As a rule, any amount of pTsa greater than 0% yields an increase in dielectric constant, especially at steady state.

In one example, Sulforicinolate sodium salt (Turkey Red Oil, also known as sulfonated castor oil) has two functions: 1) to plasticize the interior of the ionic cluster and 2) to add an additional charge to increase the polarizability of the ionic cluster. The oil may be in Na+ form or H+ form. The Na+ form may be obtained readily. This additive may prevent or inhibit crystallization of ionic blocks with pTsa and other ionic blocks, which enhances polarization of isolated ionomeric domains within a film. Also, it is thought that this additive may have had reduced losses (e.g. less than one). In one example, sulfonated castor oil is added in a range from 2 weight % to 6 weight % of the polymer resulted in reduced losses and increased the dielectric constant at and near steady state.

In one example, Poly(tert)-butyl styrene may be added. Poly(tert)-butyl styrene may have a molecular weight selected in a range from 50000 to 100000, for example. For example, 8 wt % of Poly(tert)-butyl styrene may be added to the polymer. In one example, a range of Poly(tert)-butyl styrene is added from 2% to 10 wt %, more preferably 4 wt % to 8 wt %.

In one example, more than one of these additives is added to a solution of a functionalized block copolymer and a solvent that form isolated polarizable domains. The presence of additives that plasticize the midblock or add polar molecules to the ionomeric domains or prevent crystallization within or adjacent to the ionomeric domains or prevent transition from more spherical, isolated polarizable domains to less spherical, polarizable domains or enhance the bulk resistivity have achieved surprising and unexpected dielectric properties in this new class of dielectric materials with isolated polarizable domains.

In one example a combination of additives may show a synergistic effect when added to a block copolymer that forms isolated polarizable domains. For example, a dodecylbenzenesulfonic acid additive, a poly(tert)-butyl styrene additive, and a sulfonated castor oil may be added to a tri-block copolymer that forms isolated polarizable domains. For example, when 6 wt % dodecylbenzenesulfonic acid additive, 8 wt % poly(tert)-butyl styrene additive, and 8 wt % sulfonated castor oil are added to a tri-block copolymer that forms isolated polarizable domains the dielectric constant at stead state approaches 1 million at 1 volt and tens or hundreds of millions at higher voltages and the bulk resistivity and leakage currents are improved providing a dielectric film suitable for use in energy storage capacitors for electronic devices, automotive energy storage, household energy storage, electric power grid storage and many other energy storage applications. Surprisingly, the energy density and power density of capacitors made using these dielectric materials are better than any known source of energy including liquid fuels. For centuries, mankind has been reliant on liquid fuels for portable power storage and the best batteries and ultracapacitors never even approached the power density and energy density of liquid fuels. With the advent of this new class of dielectric materials with isolated polarizable domains, the age of liquid fuels will pass.

Figure 14:
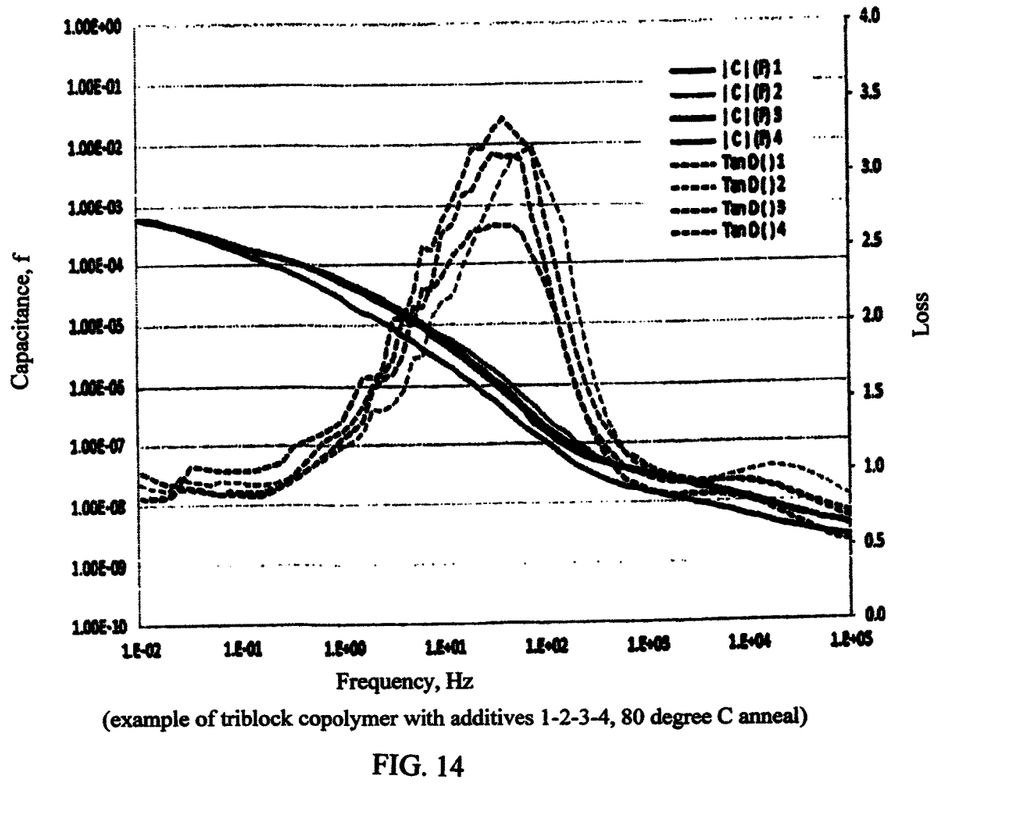
FIG. 14 illustrates another graph showing capacitance and loss for an example of a triblock copolymer with four additives with frequency of an applied voltage across a capacitor utilizing a film of the material.
Figure 15:
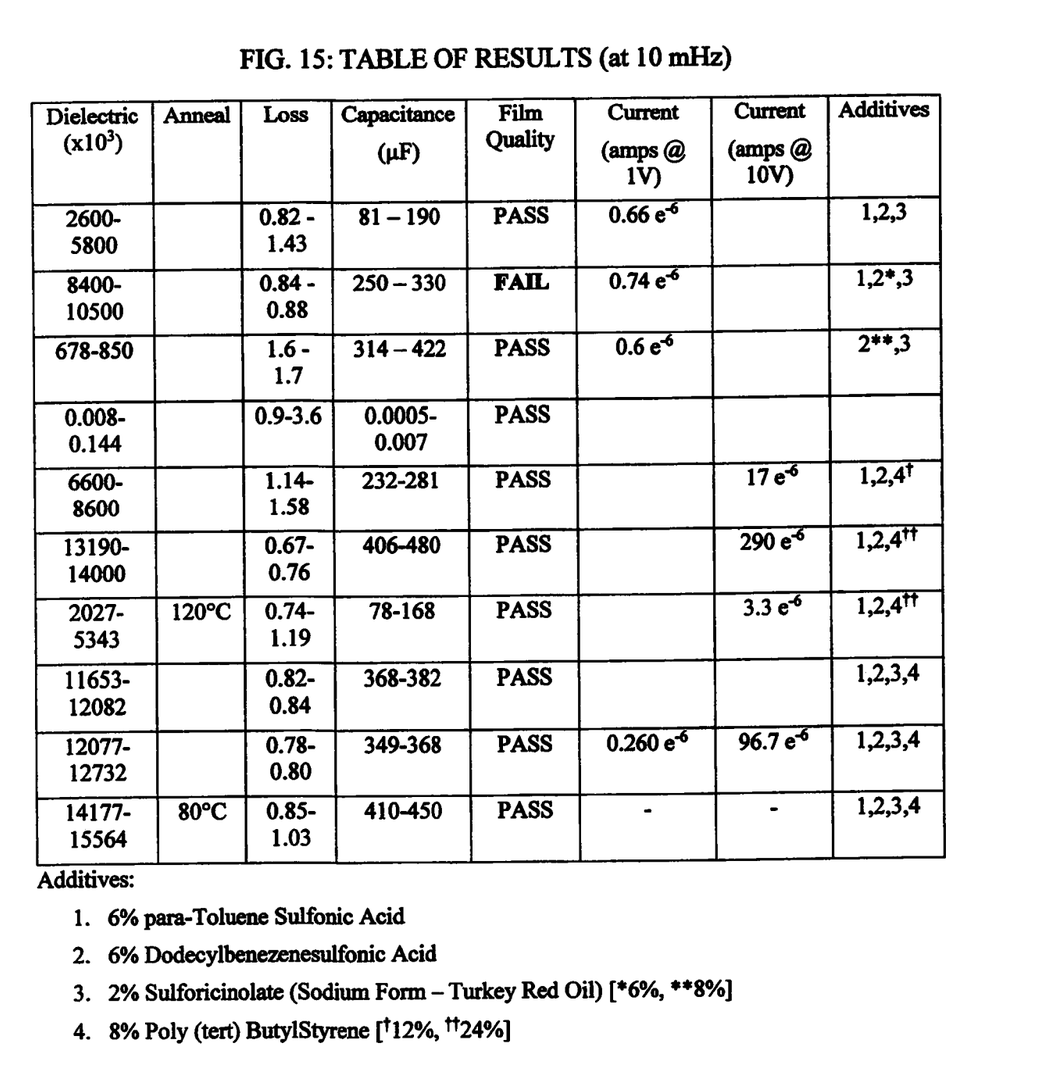
FIG. 15 illustrates a table of results for various combinations of additives with and without annealing.
Figure 16:
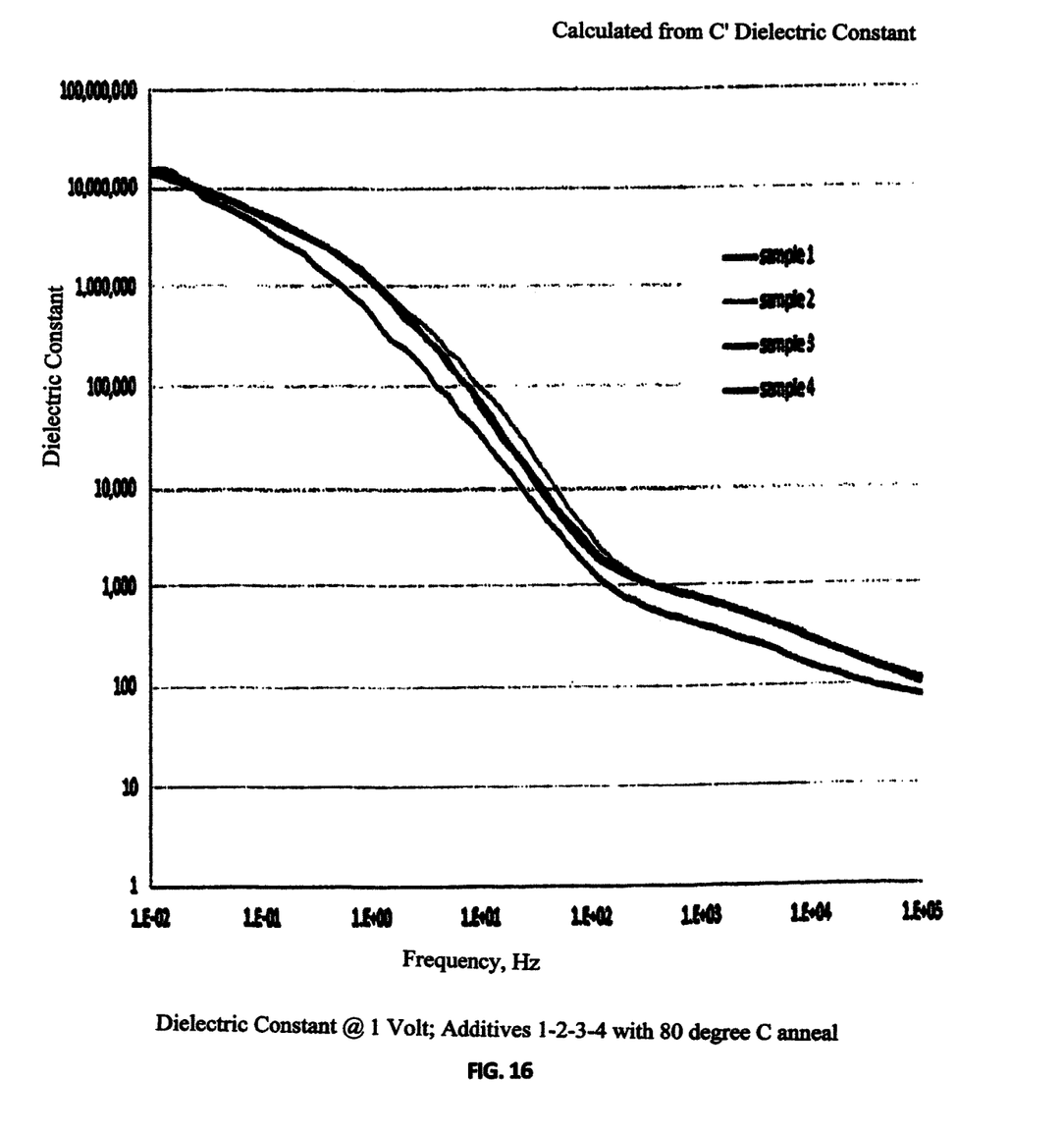
FIG. 16 illustrates a graph of the dielectric constant, as calculated, versus frequency of an applied 1 volt bias for the example in FIG. 14.

In one example, 6% para-Toluene Sulfonic Acid, 6% Dodecylbenezenesulfonic Acid, 2% Sulforicinolate (Sodium Form—Turkey Red Oil), and 8% Poly (tert) ButylStyrene were added to a triblock copolymer having a sulfonated end block, an elastic middle block and a butylstyrene first block. The block copolymer and additives were dissolved in toluene in an autoclave at a pressure and temperature sufficient to dissolve the block copolymer and additives. For example, the solution was held at temperature and pressure to remove all volatile impurities prior to remove any volatile impurities. Alternatively, 6% and 8% of Sulforicinolate (Sodium Form—Turkey Red Oil) were added, instead of 2%, and the dielectric properties were no better or were worse than when 2% was used. Alternatively, 12% or 25% of Poly (tert) ButylStyrene were added, but results were not significantly better or were worse than when 8% was added to solution prior to forming a film. FIGS. 14-16 provide examples of dielectric films used to form capacitors. For example, a dielectric film was cast directly onto a metal electrode. The electrode may be heated to a casting temperature, such as 65 degrees centigrade. All but one of the cast films, which were dissolved in toluene at a percent solids in a range from 15 to 18 percent, formed an acceptable film. Then, for example, a capacitor could be formed by depositing another electrode on the film opposite of the metal electrode, such as by sputtering or spray deposition. For example, a gold electrode was deposited, as a contact for testing the dielectric properties of the film. A bias voltage was applied, such as a one volt bias or a ten volt bias. In some examples, higher voltages were applied without failure. In order to evaluate the film, voltage was cycled and the results in FIGS. 14 and 16 show the result versus frequency in Hertz (Hz). As the frequency approaches a steady state voltage, the capacitance and dielectric constant increase. The current at steady state voltage may be measured, as well, and annealing at an elevated temperature, such as in a range from 65 degrees C. to 120 C, or 80 degrees C. to 120 C, the current at a ten volt steady state voltage decreases substantially. In one example the decrease is nearly two orders of magnitude. The results show a synergistic effect of combining one or more of the additives with the triblock copolymer to achieve a polymer castable as a film directly onto a metal electrode. With annealing, the four additives provide a dielectric material with surprising and unexpected results, achieving a dielectric constant never before achieved by any film even at voltages greater than 7 volts. Indeed, the films are capable of operating as dielectric films in capacitors at hundreds of volts or even thousands of volts, so long as leakage current is controlled or eliminated by additives or a barrier layer.

In one example, a hydrophobic additive is included that is soluble in toluene. For example, a perfluorodecyltrichlorosilane may be utilized to reduce sensitivity of the material to moisture. The amount of hydrophobic additive will depend on the thickness of the film and the effectiveness of the additive to prevent water from being absorbed by the film. In one example, less than 2% of the hydrophobic additive is added, and it is thought that the film forms a thin layer on the exposed surface of a film opposite of a metal electrode on which the dielectric polymer is cast. In this example, the hydrophobic additive reduces the effect of moisture on the properties of a capacitor made using the film. For example, if the hydrophobic additive forms a thin film on the surface and is otherwise not interconnected within the bulk of the polymer film, then the thin film of the hydrophobic additive may be electrically conductive. A metal layer may be deposited on the hydrophobic additive without removing the hydrophobic additive layer first.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A dielectric film comprises:
    block copolymers organized in isolated polarizable domains, each of the block copolymers comprising an ionically functionalized block on a free end of the block copolymers and an electrically isolating block coupled to the ionically functionalized block, wherein the ionically functionalized block of each of the block copolymers is selected to be less soluble in a selected solvent than the electrically isolating block such that, when the block copolymers are dissolved in the selected solvent and a solution is prepared, the ionically functionalized ends of the block copolymers interact with each other and aggregate to form isolated polarizable domains before the block copolymers precipitate from the solution during forming of the dielectric film and remain as isolated polarizable domains after the solvent is removed and the dielectric film is formed.

2. The dielectric film of claim 1, wherein the electrically isolating blocks of the block copolymers cooperatively form an electrically isolating shell about a core of the isolated polarizable domains comprised of the ionically functionalized blocks.

3. The dielectric film of claim 2, wherein one or more additives are disposed selectively within the core to increase the dielectric constant of the dielectric film.

4. The dielectric film of claim 3, wherein the ionically functionalized ends are sulfonated.

5. The dielectric film of claim 4, wherein the dielectric constant is greater than 100 with a bias of 1 volt applied at a frequency of 10 mHz.

6. The dielectric film of claim 4, wherein the dielectric constant is greater than 1000 with a bias of 1 volt applied at a frequency of 10 mHz.

7. The dielectric film of claim 4, wherein the dielectric constant is greater than 10,000 with a bias of 1 volt applied at a frequency of 10 mHz.

8. The dielectric film of claim 4, wherein the dielectric constant is greater than 100,000 with a bias of 1 volt applied at a frequency of 10 mHz.

9. The dielectric film of claim 4, wherein the dielectric constant is greater than 1,000,000 with a bias of 1 volt applied at a frequency of 10 mHz.

10. The dielectric film of claim 4, wherein the dielectric constant is greater than 10,000,000 with a bias of 1 volt applied at a frequency of 10 mHz.

11. The dielectric film of claim 4, wherein the ionically functionalized block is comprised of a sulphonated styrene block.

12. The dielectric film of claim 11, wherein the electrically isolating block is comprised of a T-butyl block.

13. The dielectric film of claim 12, wherein the sulphonated styrene block is coupled to the T-butyl block by an ethylene-butylene block.

14. The dielectric film of claim 13, wherein a toluene sulfonic acid is disposed within the core.

15. The dielectric film of claim 14, further comprising a dodecylbenzenesulfonic acid added to the solution prior to forming the dielectric film.

16. The dielectric film of claim 15, further comprising a sulforicinolate added to the solution prior to forming the dielectric film.

17. The dielectric film of claim 16, further comprising a poly (tert) butylstyrene added to the solution prior to forming the dielectric film.

18. The dielectric of claim 13, further comprising a dodecylbenzenesulfonic acid added to the solution prior to forming the dielectric film.

19. The dielectric of claim 18, further comprising a poly (tert) butylstyrene added to the solution prior to forming the dielectric film.

20. A capacitor comprising a first electrode, a second electrode and a dielectric film separating the first electrode from the second electrode, the dielectric film comprises:
    block copolymers organized in isolated polarizable domains, each of the block copolymers comprising an ionically functionalized block on a free end of the block copolymers and an electrically isolating block coupled to the ionically functionalized block, wherein the ionically functionalized block of each of the block copolymers is selected to be less soluble in a selected solvent than the electrically isolating block such that, when the block copolymers are dissolved in the selected solvent, the ionically functionalized ends of the block copolymers interact with each other and aggregate to form isolated polarizable domains before the block copolymers precipitate from solution during forming of the dielectric film and remain as isolated polarizable domains after the solvent is removed and the dielectric film is formed.

\* \* \* \* \*